June 16, 1964 H. J. KAZIENKO 3,137,509
PIPE COUPLING
Filed June 22, 1959 2 Sheets-Sheet 1
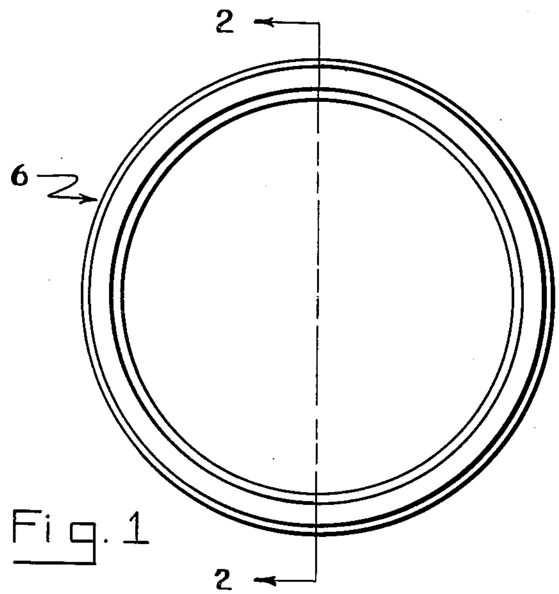
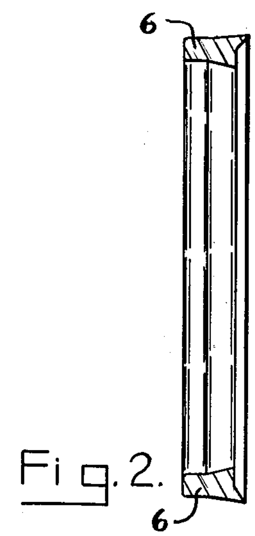
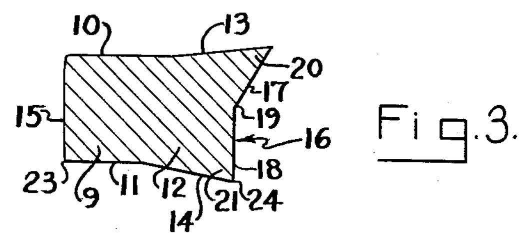
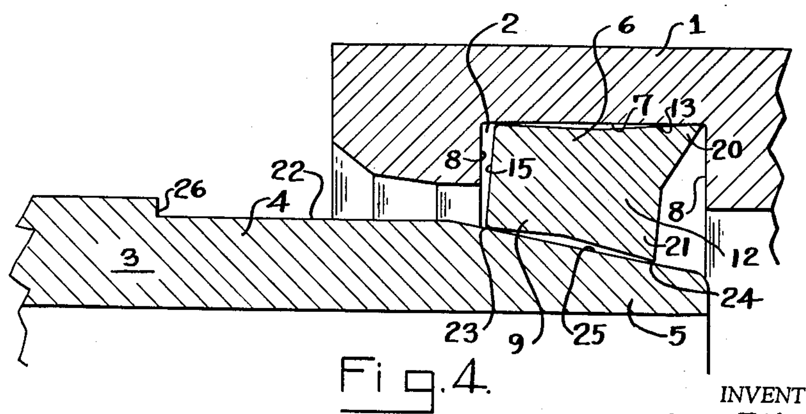
INVENTOR.
HENRY J. KAZIENKO
BY Robert M. Krone
ATTORNEY

INVENTOR.
HENRY J. KAZIENKO

BY Robert M. Krone.

ATTORNEY

United States Patent Office 3,137,509

Patented June 16, 1964

3,137,509

PIPE COUPLING

Henry J. Kazienko, New Brunswick, N.J., assignor to Johns-Manville Corporation, New York, N.Y., a corporation of New York Filed June 22, 1959, Ser. No. 822,126

8 Claims. (Cl. 277—170)

This invention relates to pipe couplings and their method of assembly. While the invention has utility with many types of pipe, for example, steel or iron pipe, it is particularly adapted for use in the connecting of pipe sections composed of a hardened, compressed fibro-cement composition, and, more particularly, where a completely non-metallic coupling comprising sections of asbestos-cement pipe is desired. The features of the invention have application both in couplings for so-called "pressure" pipe, and "non-pressure" pipe designed for operation at desired pressures. The novel features of the invention may be utilized effectively on bell and spigot type couplings or sleeve type couplings which permit the removal or replacement of pipe sections or the tapping into a line when desired. Therefore, it is intended that the word coupling, as used herein, include all types of joints between adjacent pipes or units.

More specifically, the instant invention is directed to the types of coupling which are fully explained in the United States patent to Heisler, Patent No. 2,738,992 issued March 20, 1956. In one form of the Heisler coupling in its assembled state, a resilient sealing gasket is seated in a groove at each end of the coupling sleeve and is arranged to abut against a stop shoulder on the end of the pipe section received within that end of the sleeve, the stop shoulders being so positioned with respect to the ends of the pipe sections that the sleeve is centered over the ends of the pipe sections and such ends are separated from each other so as to allow for longitudinal expansion of the pipe sections. The gasket in the assembled position is subjected to sufficient radial compressive force to flatten it in a radial direction at least to some extent so as to provide an initial seal. Because of the contour of the groove, the gasket is permitted only limited axial movement or deformation and as fluid pressure within the pipe line increases, the pressure of the gasket against the pipe and sleeve surfaces with which it is in contact correspondingly increases so that the sealing effect is enhanced in the same manner as with all interference or pressure assisted seals. In order to prevent gasket blow-out under extreme pressures within the pipe line, the outer wall portion of each of the grooves is arranged to lie generally radially opposite the adjacent stop shoulder, i.e., the outer wall portion of the groove is so positioned that the stop shoulder cooperates with it to form a confining wall, preventing extrusion of the gasket through the space between the sleeve and the pipe section. Since in this general type of coupling the gasket must extend radially inwardly a sufficient distance to be engaged by the stop shoulder and to be flattened to some extent by radial compressive forces, it is apparent that, before assembly of the coupling, the gasket will extend radially inwardly of that portion of the pipe circumference on which it will ultimately seat and will be exposed to the end of the pipe. Consequently, some provision must be made for preventing the end of the pipe from striking the gasket and displacing the gasket from the groove of the sleeve or distorting it during the assembly operation. Arranging the outer circumference of the pipe section to have a progressively smaller diameter adjacent its end reduces but has been found not to eliminate entirely the problem of displacing or distorting gaskets during assembly.

This difficulty, which is of great concern in the pressure pipe field, has been found principally to be caused either by improper lubrication of the pipe end or the accidental dislodging of dirt from adjacent surroundings, which dirt falls on the exposed pipe end prior to the installation. Thus, when the pipe end contacts the resilient gasket in these areas of improper lubrication or excessive dirt, extremely high frictional characteristics are developed so that in some instances part of the resilient gasket moves with the pipe and is either displaced from the groove in the coupling or develops an undesirable twist therein. The result of such a displaced or distorted ring is a leak which occurs when the pipe is placed under pressure. In some instances, the leak due to the displaced or distorted ring is not apparent during the initial pipeline hydrostatic test. The leak due to the displaced or distorted ring may not develop and cause trouble until after the pipeline has been in service for a period of time. The repairs required by such failures to an existing pipeline are extremely expensive. Since it is most improbable that human error can be entirely eliminated in the assembly of such pipe couplings, it is necessary to design a foolproof assembly for the joint.

It is an object of this invention to provide a resilient gasket for cooperation with a pipe end and a coupling in the formation of a pipe joint and which, even under extremely adverse conditions, will not be readily displaced or distorted from its proper position or orientation during assembly of the joint.

The foregoing object is accomplished in accordance with the instant invention by a resilient gasket having a cross-sectional shape which cooperates with the coupling and the pipe end in a unique manner to prevent the displacement or distortion of the resilient gasket during the formation of the joint wherein, in the preferred embodiment, the resilient gasket seats in a groove in the coupling and is compressed between the coupling and the pipe end. The resilient gasket is formed so that when the pipe end is inserted into the coupling, it initially and substantially simultaneously contacts the inner peripheral surface of the resilient gasket at two distinct annular ridges spaced a predetermined distance apart axially thereof. The exact reasons are not precisely known but tests have revealed that unless this contact of the pipe end and the resilient gasket at two distinct annular ridges spaced a predetermined distance apart along the longitudinal axis thereof is provided for, there is a tendency for the resilient gaskets to become displaced from the groove or twisted therein so that leaks in the joint, as described above, develop. After the initial contact, the insertion of the pipe end into the gasket is continued until the joint is completed.

The invention will be more fully understood and further objects and advantages thereof will become apparent when reference is made to the following detailed description of the preferred embodiments of the invention and the accompanying drawings in which:

FIG. 1 is a view in end elevation of a resilient gasket made in accordance with the instant invention;

FIG. 2 is a view in cross-section taken along the plane passing through the line 2—2 of FIG. 1;

FIG. 3 is an enlarged cross-sectional view of the resilient gasket;

FIG. 4 is a view in cross-section of a portion of a joint, split axially thereof, and illustrating the initial contact between the pipe end and the resilient gasket;

Figure 5:
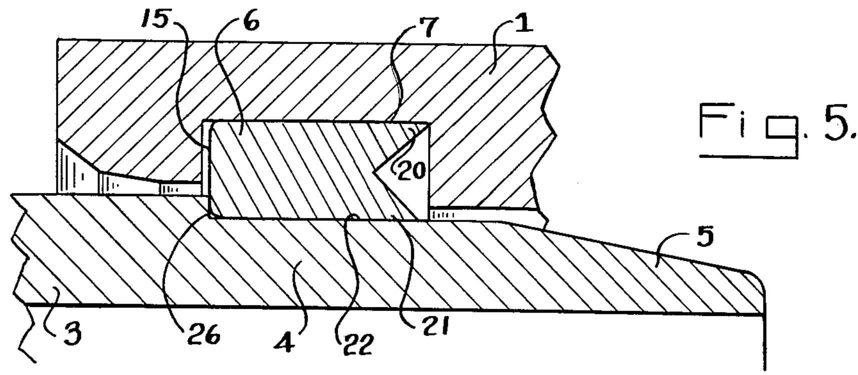
FIG. 5 is a view in cross-section of a portion of an assembled joint, split axially thereof.

Referring to the drawings there is disclosed in FIG. 4 a portion of a coupling 1 having a generally cylindrical body and an annular groove 2 formed radially outwardly from the inner circumference of the coupling. The coupling 1 is adapted to receive the pipe end 3 having a section 4 of a substantially cylindrical outer circumference or periphery and a portion 5 adjacent the end of the pipe which is tapered on its outer periphery at an angle of, for example 10° to 15° with respect to the axis of the portion. The outer diameters of the end portion of the pipe received within the coupling 1 are sufficiently smaller than the inner diameter of the coupling 1 that clearance is provided for axial movement and for limited canting of the pipe end and coupling relative to each other.

An annular resilient readily deformable gasket 6 of rubber, synthetic rubber, or any suitable resilient and readily deformable plastic material is disposed in the groove 2. The inside diameter of each gasket in its relaxed state preferably is slightly smaller than the outside diameter of the respective pipe end, so that it is stretched somewhat when in assembled position thereon. The minimum outside diameter of each gasket relaxed preferably is substantially equal to or slightly greater than the diameter of the groove 2 measured between portions of its radially outer wall 7. The initial radial thickness of the gasket, in its relaxed or undeformed state, is somewhat greater than the distance between the radially outer wall 7 of the groove 2 and the radially opposite portion of the outer periphery of the pipe end, so that upon assembly the gasket is flatttened to some extent in a radial direction and deformed outwardly in an axial direction. The width of the groove in the coupling 1 is greater than the axial width of the gasket in its deformed state. The groove in the coupling 1 has annular axially opposite end walls 8 preferably extending substantially perpendicular to the axis of the coupling 1. In the final assembled position of the joint, as illustrated in FIG. 5, the radially outer wall 7 of the groove 2 is radially opposite the cylindrical section 4 of the pipe end 3.

As shown, particularly in FIGS. 3 and 4, the annular resilient gasket 6, in its relaxed state, has a leading section 9 having substantially cylindrical inner and outer circumferences 10 and 11 and a trailing section 12 having substantially frusto-conical inner and outer circumferences 13 and 14 formed as generally axially directed extensions of the circumferences 10 and 11. One of the functions of the frusto-conical circumference 13 is to tilt the gasket to increase the effective taper of the circumference 14 for a purpose to be described. The leading edge 15 preferably extends substantially perpendicular to the axis of the resilient ring 6. The trailing edge 16 has angularly disposed surfaces 17 and 18 meeting at an apex 19 and forming lip portions 20 and 21 which are adapted to be urged outwardly by the pressure within the coupling into firm contact with the radially outer wall 7 of the groove 2 in the coupling 1 and the peripheral surface 22 of the cylindrical portion 4 of the pipe end 3. Lip portion 20, bearing on the wall 7 of the groove 2, provides the tilting action of the gasket previously mentioned. The resilient gasket 6 has a first continuous annular ridge 23 formed at the junction of the leading edge 15 and the inner circumference 11 of the leading section 9 and a second continuous annular ridge 24 adjacent the junction of the angularly disposed surface 18 and the frusto-conical inner circumference 14. The first annular ridge 23 thus is spaced generally axially from, and cooperates with, the second annular ridge 24 to form an imaginary frusto-conical surface having a taper that substantially coincides and mates with the taper of the outer circumference 25 of the portion 5 of the pipe end 3. It is this novel cooperation of elements that forms the basis for the principal features of the instant invention.

The principal features of the instant invention are clearly illustrated in FIG. 4 which discloses the instant during the assembly of a pipe joint wherein the outer circumference 25 of the tapered portion 5 of the pipe end 3 comes into contact with first and second annular ridges 23 and 24 of the resilient gasket 6. It is to be noted that, in the preferred form of the invention, as illustrated herein, the actual coinciding taper of the imiginary frusto-conical section formed by the first and second annular ridges 23 and 24 is augmented by the tilting of the resilient annular gasket 6 by the tapered circumference 13. However, accomplished, the main feature of the instant invention is that the initial contact between the tapered circumference 25 and the first and second annular ridges 23 and 24 be substantially simultaneous. As illustrated in the drawing, as the pipe end is inserted into the coupling 1, the outer circumference 25 of the tapered portion 5 of the pipe end 3 initially and substantially simultaneosly contacts the first and second annular ridges 23 and 24 of the resilient gasket 6. By substantially simultaneous contact is meant that although either of the annular ridges 23 or 24 may be first contacted by the tapered circumference 25 the other annular ridge 23 or 24 will be contacted immediately thereafter so that there exists a combination of forces acting through these contact surfaces or regions of contact to serve to resist the forces trying to displace or distort the resilient gasket 6, so that the gasket slides evenly up the incline 25 and then into its final position. As the pipe end continues to move into the coupling 1, the resilient gasket 6 is compressed between the outer radial wall 7 of the groove 2 and the outer cylindrical surface 22 of the section 4 of the pipe end 3. As illustrated in the finished joint in FIG. 5, the pipe end 3 has been inserted into the coupling 1 until the leading edge 15 of the resilient gasket 6 contacts the shoulder 26 on the pipe end 3.

As stated above, one of the primary difficulties in the field installation of the type of coupling described is that the resilient gaskets are sometimes displaced or distorted as the coupling is completed. The major cause of such failures is that through human inadvertence a section of the pipe end is not properly lubricated as the joint is prepared so that when the pipe end is inserted into the coupling a portion of the resilient gasket is pulled along therewith and is either forced out of the groove in the coupling or twisted therein. In either case, a leak will develop when pressure is applied within the pipe. The exact theory is not precisely known but repeated laboratory tests have revealed that in assemblies made in accordance with the instant invention, wherein the pipe ends had been purposely improperly lubricated, the resilient gaskets forming the fluid tight seals in accordance with the instant invention were not displaced from the groove in the coupling or twisted therein so as to result in leaks when pressure was applied within the pipe. Other assemblies, made under the same adverse conditions but with other types of resilient gaskets or where the taper on the end portion 5 of the pipe did not substantially coincide with the taper formed by the surface of the imaginary frusto-conical section defined by the first and second annular ridges 23 and 24, resulted many times in joints that leaked when pressure was applied within the pipe.

It is to be noted that there are many physical characteristics required of the resilient gaskets that must be considered, in addition to the relative dimensioning and proportioning thereof referred to in the foregoing description. Thus, the leading section 9 or heel of the resilient gasket 6 of FIG. 3, must be sufficiently thick in a radial direction to prevent gasket blowout when the pipe is subjected to pressure, especially under pipe differential loading conditions. However, the thickness of the gasket heel cannot be too great or the effort required to complete the assembly would be so great as to be practically prohibitive. Also, the gasket must possess characteristics such that when differential loading conditions in the line present a situation wherein one section of the resilient gasket is under little or no compression, another section of the resilient gasket will necessarily be held under sufficient compression to assure retention of the gasket in position to seal against leaks.

Another physical characteristic of the gasket that must be considered in a joint of this nature is the ratio of the longitudinal axial length of the gasket to its radial thickness. If the gasket length is decreased considerably, a tumbling or twisting in the groove will develop under adverse conditions as described above. Therefore, it is considered essential and necessary that the minimum axial length of the gasket be greater than the maximum radial thickness thereof, wherein the axial length is measured along a center line from the leading edge 15 of the gasket to the apex 19 of the notch formed by the angularly disposed surfaces 17 and 18 in the trailing edge 16 of the gasket. The above ratio of gasket axial length to radial thickness should be greater than 1.2:1 and in the preferred form of the invention, the ratio is 1.6:1. Sufficient clearance must be allowed axially in the groove of the coupling to permit the easy and natural axial expansion of the resilient gasket when it is compressed between the pipe end and the coupling. If the resilient gasket could not expand in the groove, then the assembly effort would be so great that it would not be possible to complete the joint. In previous practices, as disclosed in Heisler, column 5, lines 14–16, inclusive, it was necessary to coat the pipe ends, the grooves and the gaskets with lubricant in the normal assembly. However, in accordance with the prescribed method of assembly for a pipe joint made in accordance with the instant invention only the pipe end is coated with a lubricant.

Figure 6:
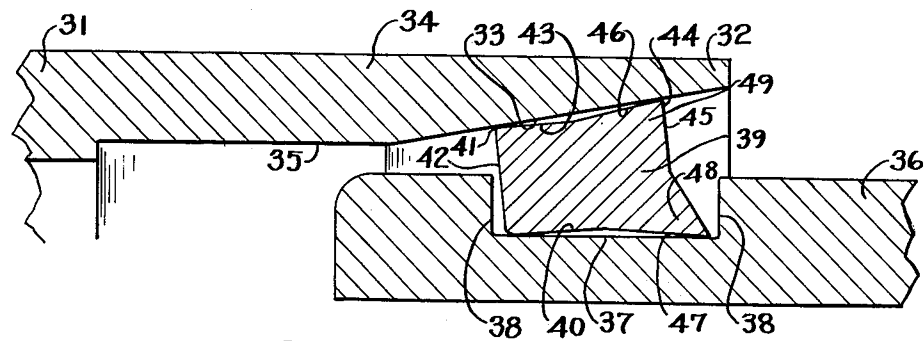
FIG. 6 is a view in cross-section of a portion of another form of joint split axially thereof and illustrating the initial contact between the coupling and the resilient gasket.
Figure 7:
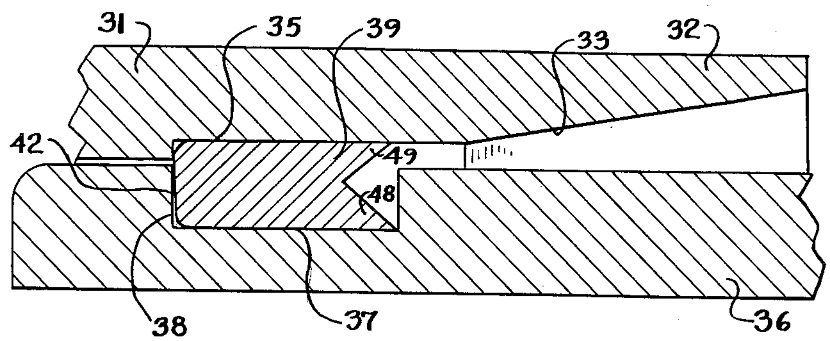
FIG. 7 is a view in cross-section of a portion of the joint, as illustrated in FIG. 6, in final assembly.

In the form of the joint illustrated in FIGS. 6 and 7, the relative contours of the surfaces on the coupling 1, the resilient gasket 6 and the pipe end 3 have been reversed. Thus, the coupling 31 has a leading portion 32 having an inner circumference 33 tapered at an angle of, for example 10° to 15°, with respect to the axis of the coupling 31 and a portion 34 having an inner circumference 35 that is substantially cylindrical in nature. The pipe end 36 which cooperates with the coupling 31 has a groove having a radially inner wall 37 and annular axial end walls 38 preferably extending susbtantially perpendicular to the axis of the pipe end 36.

An annular resilient gasket 39 is seated in the groove with its inner peripheral surface 40 contiguous the radially inner wall 37. The annular resilient gasket 39 is similar to the annular resilient gasket 6 except for the reversal of parts. Thus, the first annular ridge 41 is formed adjacent the junction of the leading edge 42 and the outer circumference 43, and the second annular ridge 44 is formed adjacent the junction of the angularly disposed surface 45 and the outer tapered circumference 46. The taper formed by the imaginary connection between the first and second annular ridges 41 and 44, augmented, as described above with regard to the tapered surface 13, by the tilt given by the tapered inner circumference 47, substantially coincides and mates with the taper of the inner circumference 33. The cooperation between the various elements is substantially the same as that described above except that the joint is not recommended for extremely high pressures since the lip portions 48 and 49 are not in proper position to be urged apart by the pressure within the joint but instead are urged apart by the differential pressure effective externally only upon the occurrence of pressure reversals to a lower-than-atmospheric pressure condition in the line. The advantages of the form of the invention illustrated in FIGS. 6 and 7 are thus related chiefly to the ease of assembly.

In the preferred operation, the resilient gasket 6 is seated in the groove 2 in the coupling 1 so that the outer circumference of the resilient gasket 6 contacts the radially outer wall 7 in the groove 2 and so that the leading section 9 of the resilient gasket 6 is disposed toward the open end of the coupling 1 which is to receive the pipe end 3. A coating of lubricant is applied to the pipe end. As illustrated in FIG. 4, the pipe end 3 is inserted into the coupling 1 so that the outer circumference 25 of the tapered section 5 of the pipe end initially and substantially simultaneously contacts the first and second annular ridges 23 and 24 of the resilient gasket 6. The insertion of the pipe end into the coupling is continued until the pipe end is properly oriented in final assembly by a part of the leading edge 15 contacting the shoulder 26 while a portion of the trailing edge 26 contacts the end walls of the groove 2 axially opposite the shoulder 26. In an assembly wherein the pipe end has been poorly lubricated some gasket distortion occurs from the frictional forces acting thereon but such distortion produces only a displacement of a negligible amount, and there will be no leakage of the joint when pressure is applied within the pipe.

While it is not entirely clear why the vastly improved results are obtained by this invention, both as to greater ease of assembly and substantial elimination of gasket distortion in assembly, and resulting prevention of fluid leaks caused thereby, it appears essential to employ the plurality of ridges on the gasket surface contiguous to the tapered surface of the associated male or female coupling element, to act somewhat as sleds to hold friction to a minimum between the two while at the same time stabilizing the gasket against twist or other distortion, and the successful operation of the construction appears to be clearly enhanced by the provision of the additional set of a plurality of ridges on the opposite peripheral surface of the gasket, which ridges cooperate with the generally axially extending wall of the groove to produce the tilting action referred to above and to help insure the substantially simultaneous contact of at least two of the first plurality of gasket ridges with the said tapered surface. This contact of two generally axially spaced annular gasket ridges with the tapered surface provides the stabilized sled-like action previously mentioned. It will be understand that, while two ridges on each of the said gasket peripheries are preferred, it is also contemplated that, within the spirit of the invention and its mode of operation, certain of the advantages refered to above could be obtained in some degree by the use of more than two ridges on either or both of the said peripheral surfaces of said gasket.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. The combination of elements at an intermediate position during the assembly of a fluid tight seal between male and female components of a pipe joint wherein an annular resilient gasket is compressed between said male and female components in fully assembled relation to form said fluid tight seal, comprising, male and female components for said pipe joint, one of said components having a tapered circumference adjacent an end thereof; an annular resilient gasket carried by the other of said components, said annular resilient gasket having a free peripheral surface adapted to contact said tapered circumference of said one component, said peripheral surface of said annular resilient gasket having at least two distinct annular ridges defining an imaginary frusto-conical surface having a taper when in position on said other of said components, substantially coinciding with the taper of said tapered circumference of said one component, said male and female components and said annular resilient gasket at said intermediate position forming a structure wherein at least said two annular ridges are initially and substantially simultaneously contacted by said tapered circumference while said peripheral surface of said annular resilient gasket is substantially free of contact with said tapered circumference, except for said ridge contact therewith.

2. The combination of elements at an intermediate position during the assembly of a fluid tight seal between male and female components of a pipe joint wherein an annular resilient gasket is compressed between said male and female components in fully assembled relation to form said fluid tight seal, comprising, male and female components for said pipe joint, one of said components having a tapered circumference adjacent an end thereof, an annular resilient gasket carried by the other of said components, said annular resilient gasket having a free, first peripheral surface adapted to contact said tapered circumference of said one component, said first peripheral surface of said annular resilient gasket having at least a first pair of two distinct annular ridges of differing diameter spaced generally axially thereof, said annular ridges defining an imaginary frusto-conical surface, said annular resilient gasket having a second peripheral surface, a groove formed in the other of said components adjacent an end thereof so that said groove has one generally axially extending wall adapted to receive said annular resilient gasket so that said second peripheral surface is contiguous said axially extending radial wall, said second peripheral surface having at least a second pair of two distinct annular ridges of differing diameters spaced generally axially thereof, said second pair of annular ridges cooperating with said generally axially extending wall to support said annular resilient gasket so that said imaginary frusto-conical surface has a taper substantially coinciding with the taper of said tapered circumference of said one component, said male and female components and said annular resilient gasket at said intermediate position forming a structure wherein said first pair of annular ridges are initially and substantially simultaneously contacted by said tapered circumference while said first peripheral surface of said annular resilient gasket is substantially free of contact with said tapered circumference, at least otherwise than through any contact therewith by any other of said plurality of ridges.

3. The combination of elements at an intermediate position during the assembly of a fluid tight seal between male and female components of a pipe joint wherein an annular resilient gasket is compressed between said male and female components in fully assembled relation to form said fluid tight seal, comprising, male and female components for said pipe joint, one of said components having a tapered circumference adjacent an end thereof, an annular gasket carried by the other of said components, said annular resilient gasket having a free peripheral surface adapted to contact said tapered circumference of said one component, said peripheral surface of said annular resilient gasket having a substantially cylindrical section and a substantially frusto-conical section, said resilient gasket having a first annular ridge on said substantially cylindrical section and a second annular ridge on said substantially frusto-conical section, said first and second annular ridges being of differing diameters and defining an imaginary frusto-conical surface having a taper when in position on said other of said components substantially coinciding with said tapered circumference of said one component, said male and female components and said annular resilient gasket at said intermediate position forming a structure wherein said first and second annular ridges are initially and substantially simultaneously contacted by said tapered circumference while said peripheral surface of said annular resilient gasket is substantially free of contact with said tapered circumference, except for said ridge contact therewith.

4. The combination of elements at an intermediate position during the assembly of a fluid tight seal between male and female components of a pipe joint wherein an annular resilient gasket is compressed between said male and female components in fully assembled relation to form said fluid tight seal, comprising, male and female components for said pipe joint, one of said components having a tapered circumference adjacent an end thereof, an annular resilient gasket having a free, first peripheral surface adapted to contact said tapered circumference of said one component, said peripheral surface of said annular resilient gasket having a substantially cylindrical section and a substantially frusto-conical section, said annular resilient gasket having a first annular ridge on said substantially cylindrical section and a second annular ridge on said substantially frusto-conical section, said first and second annular ridges being of differing diameters and defining an imaginary frusto-conical surface, said annular resilient gasket having a second peripheral surface, a groove formed in the other of said components adjacent an end thereof so that said groove has one generally axially extending wall adapted to receive said annular resilient gasket so that said second peripheral surface is contiguous said generally axially extending wall, said second peripheral surface having third and fourth annular ridges of differing diameters spaced generally axially thereof, said third and fourth annular ridges cooperating with said generally axially extending wall to support said annular resilient gasket so that said imaginary frusto-conical surface has a taper substantially coinciding with said tapered circumference of said one component, said male and female components and said annular resilient gasket at said intermediate position forming a structure wherein said first and second annular ridges are initially and substantially simultaneously contacted by said tapered circumference while said peripheral surface of said annular resilient gasket is substantially free of contact with said tapered circumference, except for said ridge contact therewith.

5. The combination of elements at an intermediate position during the assembly of a fluid tight seal between male and female components of a pipe joint wherein an annular resilient gasket is compressed between said male and female components to form said fluid tight seal comprising male and female components for said pipe joint, one of said components having a tapered circumference adjacent an end thereof, an annular resilient gasket carried by the other of said components having a free peripheral surface adapted to contact said tapered circumference of said one component, said peripheral surface of said resilient gasket having at least two distinct and annular ridges of differing diameter spaced generally axially thereof, said annular ridges defining an imaginary frusto-conical surface having a taper when in position on said other of said components, substantially coinciding with the taper of said tapered circumference of said one component, said annular resilient gasket having a leading edge extending generally in a plane perpendicular to the axis thereof, said annular resilient gasket having a trailing edge with surfaces thereof defining an angle, with the apex of said angle directed toward said leading edge, said resilient gasket having a minimum axial length from said leading edge to said trailing edge of greater extent than the maximum radial thickness thereof, and said male and female components and said annular resilient gasket at said intermediate position forming a structure wherein said annular ridges are initially and simultaneously contacted by said tapered circumference while said first peripheral surface of said annular resilient gasket is substantially free of contact with said tapered circumference, except for said ridge contact therewith.

6. The combination of elements at an intermediate position during the assembly of a fluid tight seal between male and female components of a pipe joint wherein an annular resilient gasket is compressed between an outer cylindrical surface of said male component and an inner peripheral surface of said female component comprising male and female components for said pipe joint, said male component having an end portion having a generally cylindrical outer circumference but comprising a leading edge section having a generally tapered outer circumference having a minimum outer circumference smaller than said generally cylindrical outer circumference, an annular resilient gasket carried by said female component, said annular resilient gasket having a free radially inner peripheral surface having at least two distinct annular ridges of different diameters spaced generally axially thereof providing limited contact between said radially inner peripheral surface of said gasket and said generally tapered outer circumference, said annular ridges defining an imaginary frusto-conical surface having a taper substantially coinciding with the taper of said tapered circumference of said male component, and said male and female components and said annular resilient gasket at said intermediate position forming a structure wherein said annular ridges are initially and substantially simultaneously contacted by said tapered circumference while said peripheral surface of said annular resilient gasket is substantially free of contact with said tapered circumference, except for said ridge contact therewith.

7. The combination of elements at an intermediate position during the assembly of a fluid tight seal between male and female components of a pipe joint wherein an annular resilient gasket is compressed between an outer cylindrical surface of said male component and an inner peripheral surface of said female component comprising male and female components for a pipe coupling, said male component having an end portion having a generally cylindrical outer circumference but comprising a leading edge section having a generally tapered outer circumference having a minimum outer circumference smaller than said generally cylindrical outer circumference, an annular resilient gasket carried by said female component, said annular resilient gasket having a free peripheral surface adapted to contact said tapered circumference of said male component, said peripheral surface of said resilient gasket having when in position on said female component, at least two distinct annular ridges of different diameters spaced axially thereof, said annular ridges defining an imaginary frusto-conical surface having a taper substantially coinciding with the taper of said tapered circumference of said male component, said annular resilient gasket having a leading edge extending generally in a plane perpendicular to the axis thereof, said annular resilient gasket having a trailing edge with surfaces thereof defining an angle, with the apex of said angle directed toward said leading edge, said annular resilient gasket having a minimum axial length from said leading edge to said trailing edge of greater extent that the maximum radial thickness thereof, and said male and female components and said annular resilient gasket at said intermediate position forming a structure wherein said annular ridges are initially and substantially simultaneously contacted by said tapered circumference while said peripheral surface of said annular resilient gasket is substantially free of contact with said tapered circumference, except for said ridge contact therewith.

8. A pipe joint for confining a fluid comprising male and female components for said pipe joint, said male component having a section with a generally cylindrical outer circumference having a progressively smaller diameter adjacent an end thereof so that the smallest outside diameter of said male component is closest adjacent said end, an annular shoulder formed on said generally cylindrical section and axially spaced from said end, said female component having a generally cylindrical inner circumference, portions of the surface of which are arranged in the form of a groove having wall portions constituting a radially outer wall portion generally radially opposite said generally cylindrical section, an outer end wall portion generally radially opposite said shoulder and an inner end wall portion, an annular resilient, readily deformable gasket in said groove having a leading section facing said outer end wall portion and abutting against said shoulder and having in its relaxed state a greater initial thickness than the distance between said radially outer wall portion of said groove and said radially opposite, generally cylindrical section, said gasket being engaged therebetween under radial compressive forces in assembled relation and at least slightly flattened in a radial direction, said annular, resilient gasket having a trailing section abutting said inner wall portion and having an initial radial thickness in its relaxed state greater than the initial radial thickness of said leading section and having a minimum inner diameter smaller than the minimum inner diameter of said leading section, and said annular resilient gasket in its relaxed state having a ratio of minimum axial length to maximum radial thickness of at least 1.2:1 so that when said joint is being assembled by inserting said male component into said female component and wherein during such assembly compressive forces are being applied on said gasket to deform said gasket, the forces acting on said gasket are distributed so that the tendency of said gasket to be distorted in said groove or to be displaced from said groove is substantially eliminated.

References Cited in the file of this patent

UNITED STATES PATENTS

| | | |
|---|---|---|
| 2,081,040 | King | May 18, 1937 |
| 2,294,142 | Turner | Aug. 25, 1942 |
| 2,398,399 | Alexander | Apr. 16, 1946 |
| 2,738,992 | Heisler | Mar. 20, 1956 |
| 2,809,853 | Nathan | Oct. 15, 1957 |
| 2,871,031 | Altemus et al. | Jan. 27, 1959 |
| 2,882,073 | James | Apr. 14, 1959 |
| 2,907,596 | Maha | Oct. 6, 1959 |
| 2,916,306 | Rickard | Dec. 8, 1959 |

OTHER REFERENCES

Ser. No. 293,149, Boisson (A.P.C.), published May 25, 1943.

UNITED STATES PATENT OFFICE

CERTIFICATE OF CORRECTION

Patent No. 3,137,509 June 16, 1964

Henry J. Kazienko

It is hereby certified that error appears in the above numbered patent requiring correction and that the said Letters Patent should read as corrected below.

Column 6, line 39, for "understand" read -- understood --; column 7, line 49, after "annular" insert -- resilient --; column 9, lines 38 and 39, strike out "when in position on said female component"; line 42, after "having" insert -- , when in position on said female component, --; same column 9, line 50, for "that" read -- than --.

Signed and sealed this 20th day of October 1964.

(SEAL)
Attest:

ERNEST W. SWIDER
Attesting Officer

EDWARD J. BRENNER
Commissioner of Patents